J. S. LUKASKO.
GLASS TILE MOLD.
APPLICATION FILED SEPT. 14, 1907.

917,469.

Patented Apr. 6, 1909.

Witnesses:

Inventor
John S. Lukasko
By Geo Nesbit
Atty

UNITED STATES PATENT OFFICE.

JOHN S. LUKASKO, OF WESTON, WEST VIRGINIA.

GLASS-TILE MOLD.

No. 917,469.  Specification of Letters Patent.  Patented April 6, 1909.

Application filed September 14, 1907. Serial No. 392,924.

*To all whom it may concern:*

Be it known that I, JOHN S. LUKASKO, a resident of Weston, in the county of Lewis and State of West Virginia, have invented certain new and useful Improvements in Glass-Tile Molds, of which the following is a specification.

This invention relates to apparatus for forming glass tiles, and the primary object is to provide a mold which will produce tiles with finished edges, thus doing away with grinding and finishing the latter which is the present usual practice.

A further object is to provide improved means for forming securing ribs on the back of the tile; and further, to arrange the rib-forming grooves in the mold in such a manner as to provide outlets for the surplus glass during the pressing operation.

Figure 1:
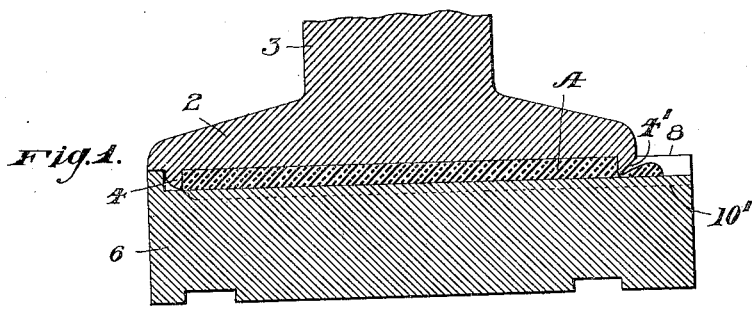
Figure 2:
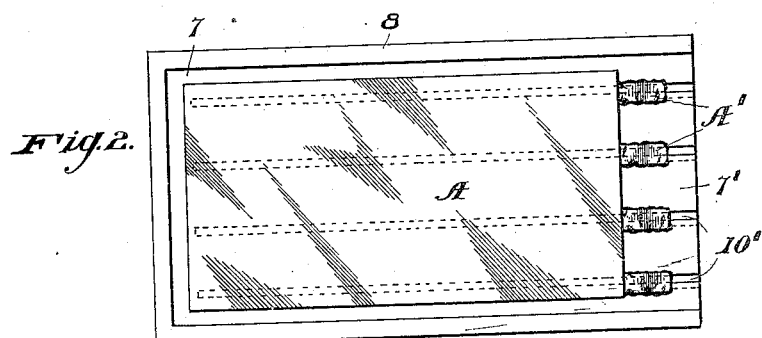
Figure 3:
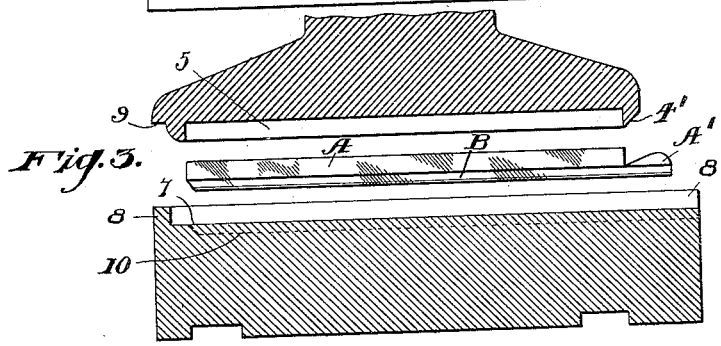
Figure 4:
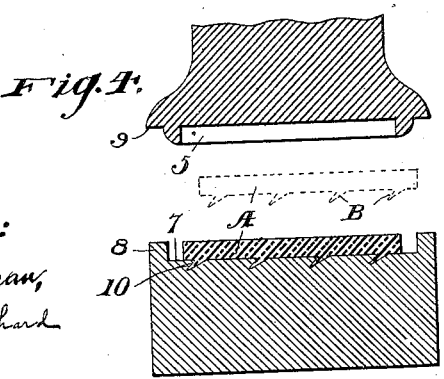

In the accompanying drawings, Figure 1 is a longitudinal sectional view of the mold and plunger, and Fig. 2 is a top plan view of the mold, showing a pressed tile in position therein. Fig. 3 is a view similar to Fig. 1, with the plunger and mold separated and with the tile raised from the mold. Fig. 4 is a cross-sectional view with the parts in the relation shown in Fig. 3, the tile being shown in the mold in full lines and raised in dotted lines.

Referring to the drawings, 2 designates the plunger-head carried by stem 3 of any suitable form of pressing apparatus. The head is preferably rectangular in shape, and depending from the bottom thereof is rim 4 which incloses forming cavity 5. This cavity is the exact shape of the tile to be pressed.

The mold 6 is depressed on its top face at 7 to cover forming cavity 5 when the plunger is seated, the rim 8 on three sides of the mold inclosing the plunger rim as shown. The latter may be formed with shoulder 9 to overhang mold rim 8. Mold face 7 is extended or enlarged at one side or end, as indicated at 7'.

10 are parallel rib-forming grooves in face or bottom 7 which extend over enlargement 7', as indicated at 10', the grooves tapering inwardly and disposed in plane oblique to face 7.

In operation, the approximate amount of molten glass to form a tile is placed in the mold and the plunger lowered, filling cavity 5 and grooves 10, and forming the tile body A and ribs B on the back or bottom face thereof by which the tile is secured to a wall or other surface. The excess glass A' is forced out through groove-extensions 10'. Side 4' of the plunger-rim, traversing the open portions of grooves 10, is tapered downwardly and so indents and scores the glass on a line dividing the tile body and the overflow glass A' that after the tile is removed the overflow may be readily cracked off without marring the outer face or edge of the tile, said surfaces being given their finished form by the pressing operation so that it is unnecessary to grind or smooth them. After the tile has been pressed the lifting of the plunger tends to start it from the mold, the tile having slight lateral or side movement as it rises to free the ribs from the grooves. The tile is not wholly removed by the plunger, but is so started that it may be readily lifted out.

While the press is here shown constructed to form only one tile at a time, the invention is not thus restricted, and other variations may be had without departing from the scope of the appended claims.

I claim:

1. In tile pressing apparatus, a mold having a laterally open plunger depression, the depression having a bottom bearing surface for the plunger with rib-forming grooves depressed in said surface, and a plunger fitting the depression and bearing on the bottom thereof, the bottom of the plunger recessed upwardly with the recess conforming to the outline and thickness of the tile body.

2. A tile press consisting of a plunger and a mold, one of said parts having a depression corresponding in outline to the tile to be pressed, and the other part having a face to cover said depression with rib-forming grooves in said face extending beyond the depression to receive the excess glass during the pressing operation.

3. A tile press consisting of a plunger having a depression in its pressing face corresponding in outline to the tile to be pressed, and a mold having rib-forming depressions extending beyond the cavity of the plunger.

4. A tile press consisting of a plunger having a depression in its pressing face corresponding in outline to the tile to be pressed, and a mold having its plunger-receiving face larger than the plunger cavity with rib-forming grooves in said face extending beyond the plunger cavity when the plunger is in the mold.

5. A tile press consisting of a plunger having a depression in its pressing face corresponding in outline to the tile to be pressed, and a mold having its top face depressed to receive the plunger with the depression larger at one side than the plunger, the bottom of the mold-depression having rib-forming grooves extending over said larger side.

6. A tile press consisting of a plunger having a rim depending from its bottom, the rim defining a cavity corresponding in outline to the tile to be pressed, a portion of the rim being tapered downwardly to form a cutting edge, and a mold having a top depression to receive the rim of the plunger, the mold being larger than the plunger on the side which receives the tapered portion of the rim, the mold bottom having rib-forming grooves extending over the larger portion of the mold.

7. A tile press consisting of a plunger and mold, one of said parts having a depression corresponding in outline to the tile to be pressed, and the other part having a face to cover the depression with rib-forming grooves in the face disposed at an angle oblique to said face.

8. A tile press consisting of a plunger having a tile forming depression in its pressing face, and a mold having rib-forming grooves in its bottom disposed at an angle oblique to the plane of the mold bottom.

9. A tile press consisting of a plunger having a tile forming depression in its pressing face, and a plunger-receiving mold having a series of parallel rib-forming grooves in the bottom thereof tapered inwardly and disposed obliquely to the plane of the mold bottom.

10. In the manufacture of glass tiles, a mold and a plunger, one of said parts being formed with open rib-molding grooves, the grooves being open for the discharge of molten glass in excess of that required for molding the tile body and ribs.

11. In the manufacture of glass tiles, a mold and a plunger, one of said parts formed with open-end rib-molding grooves, the open groove ends forming an outlet for excess glass.

12. In the manufacture of glass tiles, a mold having rib-forming grooves depressed therein, the grooves having open ends for the discharge of excess glass, and a plunger.

13. In the manufacture of glass tiles, a mold and a plunger, one of said parts having a depression corresponding in outline to the tile to be pressed, and the other part having rib-molding grooves formed therein with the grooves open at the ends for the discharge of excess glass.

In testimony whereof I affix my signature in presence of two witnesses.

JOHN S. LUKASKO.

Witnesses:
J. M. NESBIT,
ALEX. S. MABON.